(12) United States Patent
Mannepalli et al.

(10) Patent No.: US 8,898,763 B1
(45) Date of Patent: Nov. 25, 2014

(54) AUTOMATED INFRASTRUCTURE OPERATIONS

(75) Inventors: Srinivasa Susheel Kumar Mannepalli, Andhra Pradesh (IN); Anthony G. Anton, III, Issaquah, WA (US); Kurt Kufeld, Seattle, WA (US); Bhavnish H. Lathia, Redmond, WA (US); Harsha Ramalingam, Kirkland, WA (US); Manoj Bhagwan Jadhav, Andhra Pradesh (IN)

(73) Assignee: Amazon Technologies, Inc., Reno, NV (US)

( * ) Notice: Subject to any disclaimer, the term of this patent is extended or adjusted under 35 U.S.C. 154(b) by 42 days.

(21) Appl. No.: 13/607,360

(22) Filed: Sep. 7, 2012

(51) Int. Cl.
*G06F 9/50* (2006.01)
*H04L 29/06* (2006.01)
*G06F 9/40* (2006.01)

(52) U.S. Cl.
CPC ................................ *H04L 63/10* (2013.01)
USPC .................................................. 726/7; 726/6

(58) Field of Classification Search
None
See application file for complete search history.

(56) References Cited

PUBLICATIONS

A Resource Prediction Model for Virtualization Servers. Mallick et al. IEEE(Aug. 2012).*
Using Cloud Standards for Interoperability of Cloud Frameworks. Metsch et al. 2011.*
Event-based Automated Management of Cloud Applications. Arefin, Sams UI. Feb. 2011.*
SLA-Oriented Resoruces Provisioning for Cloud Computing: Challenges, Architecture and Solutions. Buyya et al. IEEE(2011).*
Ensuring Collective Availability in Volatile Resource Pools Via Forecasting. Andrezejak et al. IFIP(2008).*
An autonomous agent based incident detection system for cloud environments. Doelitzscher et al. IEEE(2011).*

* cited by examiner

*Primary Examiner* — Venkat Perungavoor
(74) *Attorney, Agent, or Firm* — Lee & Hayes, PLLC

(57) ABSTRACT

This disclosure is directed, at least partly, to automating infrastructure operations performed for a computing service. The infrastructure operations may include many tasks that are infrequently preformed by a service owner. In some embodiments, the infrastructure operations may include procuring hardware, configuring network settings, configuring security, determining and implementing monitors/alarms, deploying the computing service, and/or scaling or otherwise maintaining the computing service. Since the service owners infrequently perform these tasks, deployment of each computing service may require the service owner to reinvent or relearn each of the infrastructure operations, which may result in large inefficiencies, errors, delays, unnecessary costs, and other undesirable outcomes. By automating at least a portion of the infrastructure operations, or otherwise creating a simplified portal with a common user interface, the service owners may more easily deploy their computing service, thereby reducing errors, delays, and unnecessary costs.

22 Claims, 6 Drawing Sheets

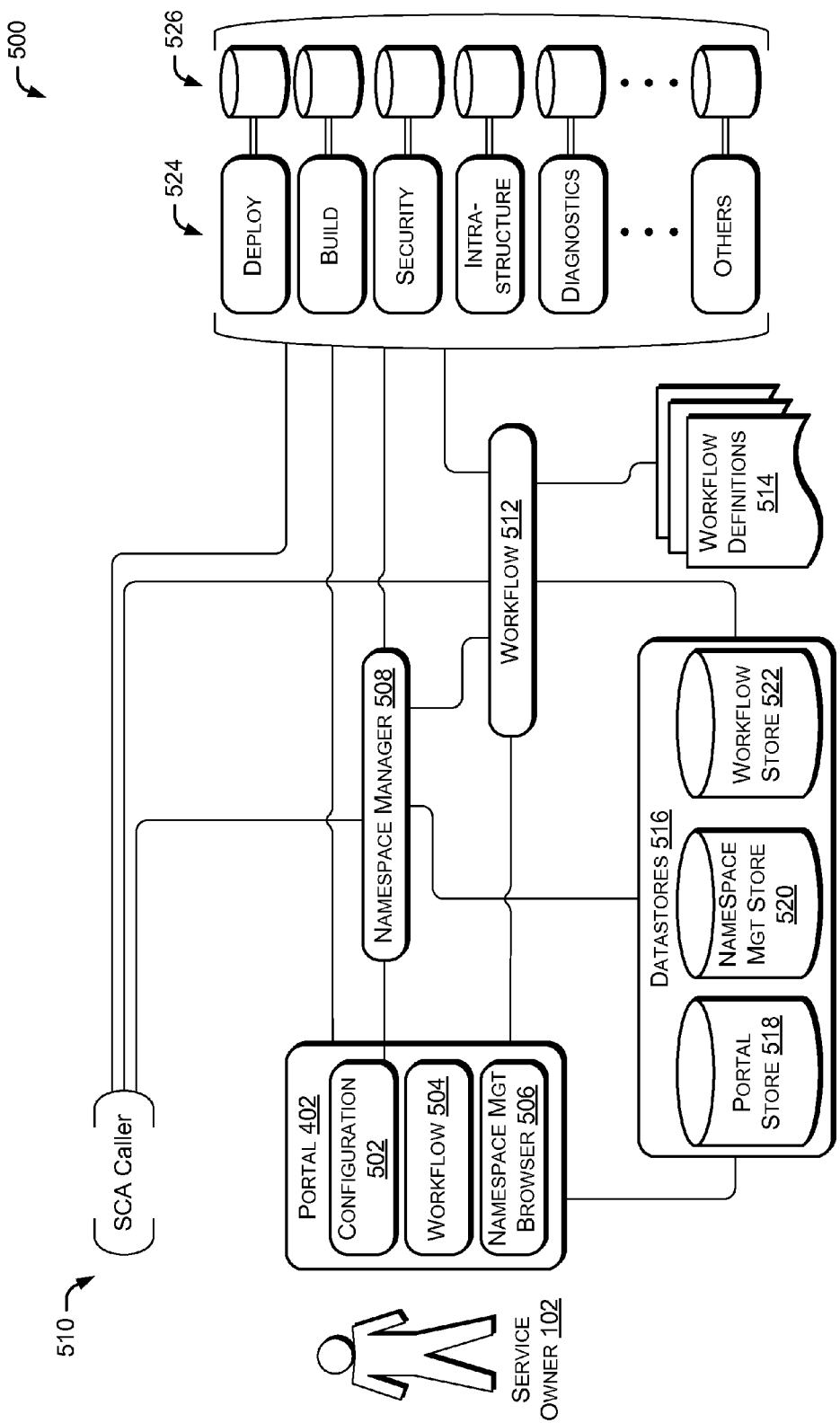

AUTOMATED INFRASTRUCTURE OPERATIONS

BACKGROUND

Computing services are often designed, setup, and deployed during a development cycle. Each of these operations, from initial concept design, through coding software, to performing infrastructure operations, requires different skill sets and knowledge. Infrastructure operations often include the deployment of hardware to run the service, as well as configuration of the hardware to support user requests of the computing service to maintain a predetermined service level agreement.

In some fast-paced businesses, a service owner, such as an individual or project team may be responsible for most or all of the tasks through the lifecycle of the computing service. For example, the service owner may be responsible for infrastructure operations when a company deploys small teams to create computing services. However, the service owner may not be familiar with some or all of the infrastructure operations such as specifics of how to request and order hardware, how to implement the hardware, how to set alarms or notifications, how to scale the service over time, and other infrastructure operation tasks. The infrastructure operations may be used to obtain and configure traditional in-house server configurations as well as cloud configured services or other distributed computing systems.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 5 is a block diagram of communications between various resources to provide automated infrastructure operations.

DETAILED DESCRIPTION

Overview

This disclosure is directed, at least partly, to automating infrastructure operations performed for a computing service. The infrastructure operations may include many tasks that are infrequently preformed by a service owner. In some embodiments, the infrastructure operations may include procuring computer resources, configuring network settings, configuring security, determining and implementing monitors/alarms, deploying the computing service, and/or scaling or otherwise maintaining the computing service. Since the service owners infrequently perform these tasks, deployment of each computing service may require the service owner to reinvent or relearn each of the infrastructure operations, which may result in large inefficiencies, errors, delays, unnecessary costs, and other undesirable outcomes. By automating at least a portion of the infrastructure operations, or otherwise creating a simplified portal with a common user interface, the service owners may more easily deploy their computing service, thereby reducing errors, delays, and unnecessary costs.

In various embodiments, the automated infrastructure operations may be accessed and controlled by the service owner using a control system accessible via the portal. The portal may be implemented using one or more user interfaces that provide a consistent look and feel for the service owner. The control system may be configured to interact or communicate with multiple different systems to enable deployment of the computing service on one or more different types of computing systems. Application program interfaces (APIs), scripts, or other "piping" used by the control system may manage details of the various different systems while providing the consistent look and feel of the user interfaces for the service owner. As an example, some computing systems may deploy different types of monitors/alarms, different security configurations, or have other controls or settings. The control system may use generic identifiers for these controls to assist the service owner when performing operations to setup and deploy their computing service on a computing system using the control system.

In accordance with some embodiments, automation of infrastructure operations may be achieved by performing one or more of: (a) creating a canonical infrastructure operations API set that enables service owners to program against infrastructure operations similar to any other computing service, (b) automating the infrastructure operations behind the API set, (c) providing an extensible set of templates and/or workflows to enable the service owners to configure infrastructure operations for their services, and (d) making available the APIs, templates and/or workflows, and documentation within the portal.

The techniques and systems described herein may be implemented in a number of ways. Example implementations are provided below with reference to the following figures.

Illustrative Environment

Figure 1:
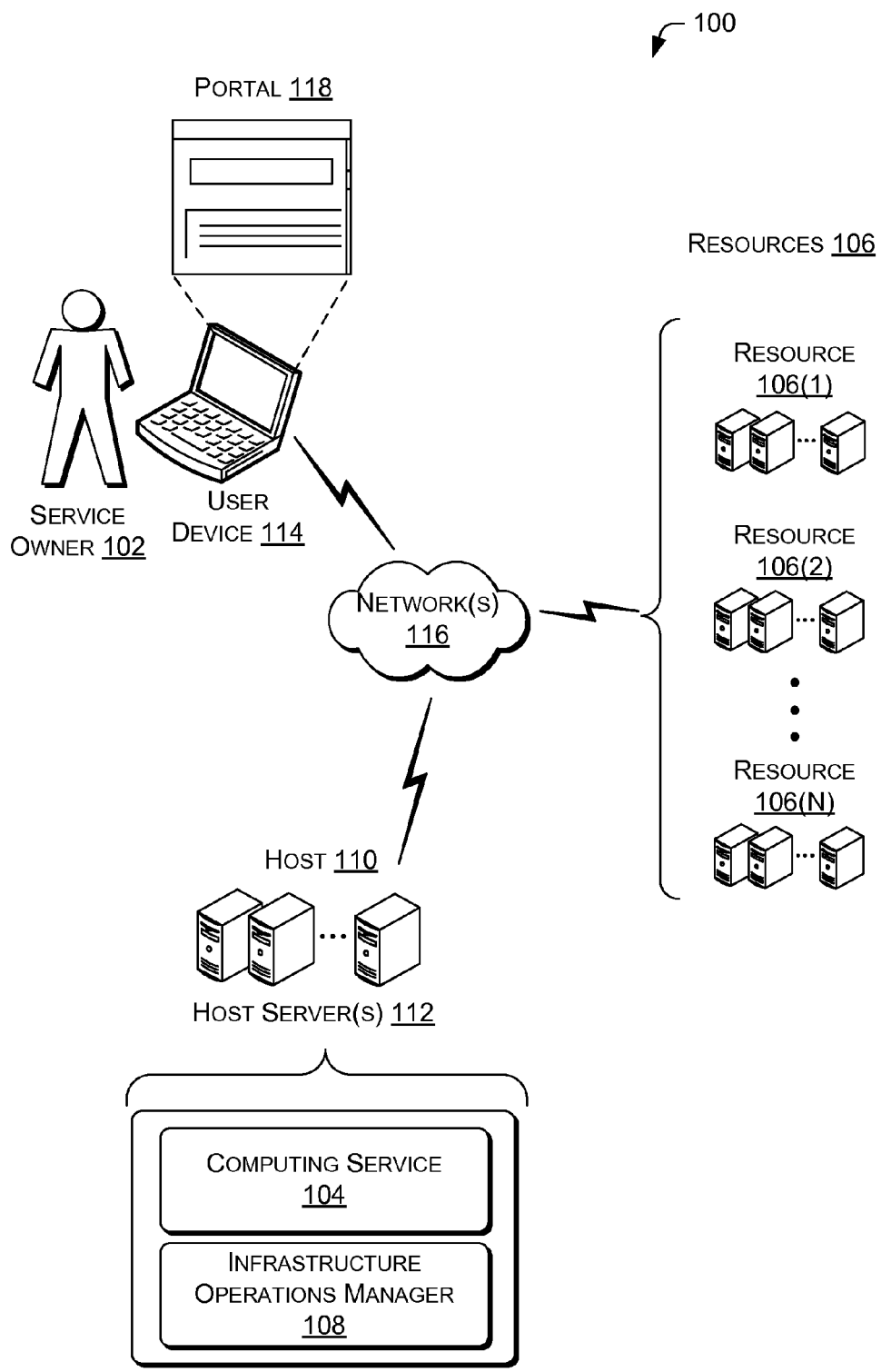
FIG. 1 is a schematic diagram of an illustrative computing environment to provide automated infrastructure operations to enable a service owner to deploy and maintain a computing service.

FIG. 1 is a schematic diagram of an illustrative computing environment 100 to provide automated infrastructure operations to enable a service owner 102 to deploy and maintain a computing service 104. The service owner 102 may include one or more of a developer, a business owner, a project team member, or other party that develops a computing service to be deployed to resources 106 which execute the computing service as intended by the service owner 102. However, before the service owner 102 can deploy the computing service 104 to the resources 106, the service owner may interact with an infrastructure operations manager 108 made available by a host 110 to perform automated infrastructure operations, which may obtain or otherwise acquire (rent, lease, share, etc.) some of the resources 106, create monitors/alarms, configure security, and perform other infrastructure operations. The host 110 may include host servers 112 that process requests at least partly for the service owner 102.

The service manager 102 may interact with the host servers 112 using a user device 114 in communication with the host servers 112 via a network 116. In some embodiments, the network(s) 116 may also facilitate communications between the host servers 112 and the resources 106 and/or between the user device 114 and the resources 106. The network(s) 116 may include local area networks (LANs), wide area networks (WANs), the internet, mobile telephone networks, Wi-Fi networks, or other types of networks. The user device 114 may include a stationary computing device or a mobile computing device, such as a mobile telephone, tablet computer, laptop computer, or other devices that can exchange information with the resources 106 and the host servers 112 via the network(s) 116.

Initially, the service owner 102 may design and create the computing service 104 to be deployed on the resources 106. The computing service 104 may or may not be customer facing. For example, some computing services may be customer facing applications and respond to user requests while other computing services may be back-end services or other types of services that do not respond directly to user requests. The computing service 104 may be deployed locally using hardware or resources that are under control of the service owner 102 or associates of the service owner (e.g., a company or entity that the service owner works for, etc.) or deployed using shared and/or distributed hardware or resources, such as by using a cloud computing platform. The computing service 104 may perform any number of tasks or operations, such as to provide messaging, host functionality of an electronic marketplace, perform calculations, manage operations, and so forth. In some embodiments, after design and creation of the computing service 104, the service owner 102 may upload the computing service 104 to the host servers 112. However, in some instances, the service owner 102 may retain the computing service 104 for later transmission to the resources 106 once the resources 106 are obtained using the infrastructure operations manager 108 as discussed below.

The host 110 may provide a portal 118 for access by the service owner 102 via the user device 114. The portal 118 may provide access to the infrastructure operations manager 108. The portal 118 may provide various controls to enable the service owner 102 to selectively perform the infrastructure operations for the computing service 104, such as request computing resources (e.g., the resources 106), create monitors/alarms, configure security, and other infrastructure operations prior to or after deployment of the computing service 104 by the infrastructure operations manager 108. The infrastructure operations manager 108 may include various modules to perform the infrastructure operations, which are described below with reference to FIG. 2. As discussed herein, computing resources may include computing hardware, computing services (e.g., software), and/or other types of computing resources that have hardware and/or software components.

Illustrative Computing Architecture

Figure 2:
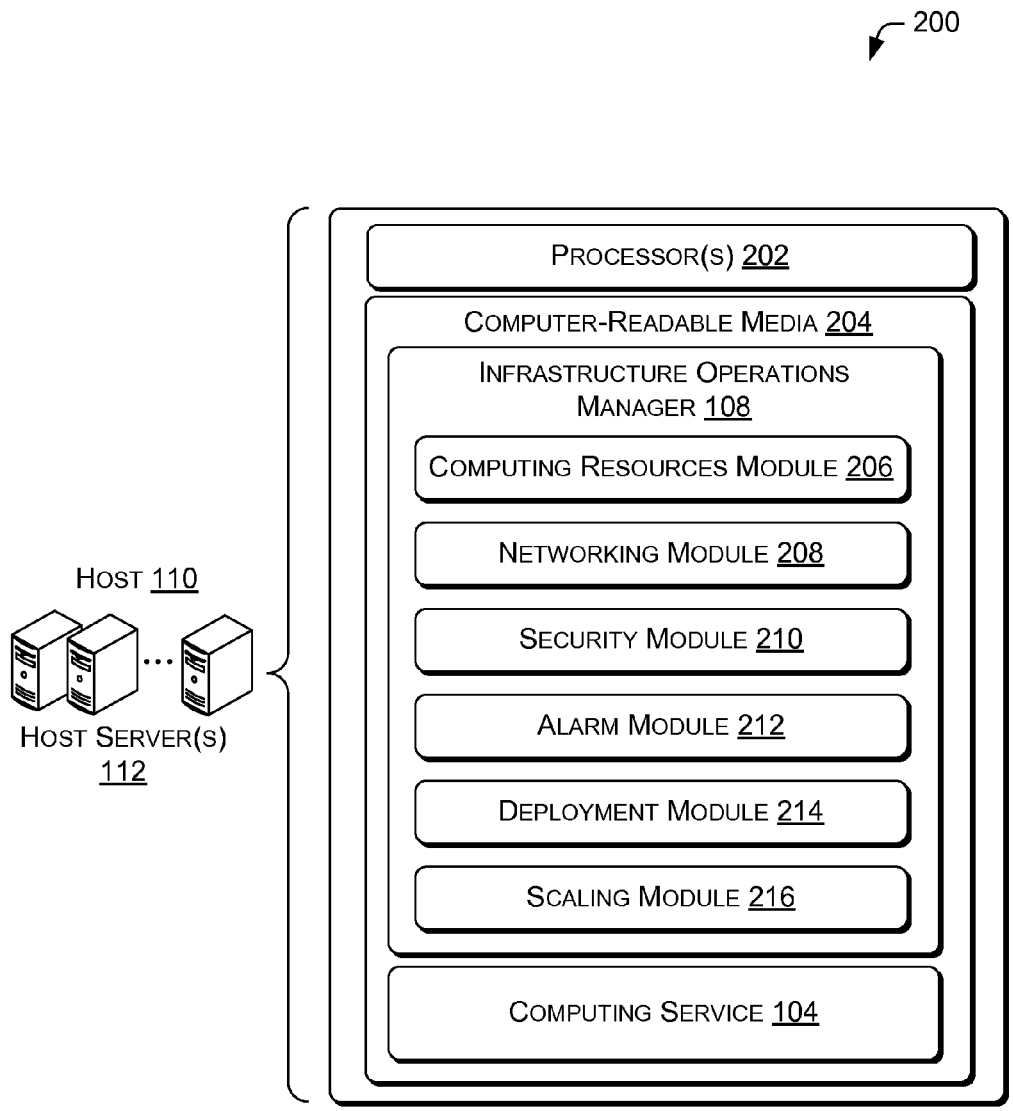
FIG. 2 is a block diagram of an illustrative computing architecture to automate infrastructure operations.

FIG. 2 is a block diagram of an illustrative computing architecture 200 to automate infrastructure operations. The computing architecture 200 may be implemented in a distributed computing environment (e.g., cloud computing platform, etc.) or non-distributed computing environment (e.g., a server farm, etc.), which is represented by the host servers 112.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the host servers 112.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 204 may store the computing service 104 and the infrastructure operations manager 108, which may include various modules. The modules may include a computing resources module 206, a networking module 208, an alarm module 210, a security module 212, a deployment module 214, and a scaling module 216. Each of the modules is discussed in turn.

The computing resources module 206 may provide guidance to the service owner 102 and may order, reserve, allocate, or otherwise access computing resources (e.g., the resources 106) to execute the computing service 104. The computing resources module 206 may determine a number of orders, requests, transactions, or other volume of data to be executed based on inputs such as forecasts or other data provided by the service owner 102. In some embodiments, the computing resources module 206 may provide templates, which the service owner 102 may modify based on requirements of the computing service 104 and various forecasts provided by the service owner. An example template may be modeled for an electronic marketplace that includes a forecast of items to be sold (e.g., number of digital downloads, etc.). Another example template may be modeled for a social networking application that is accessible to users of a social network. Many other types of templates may be created for various types of computing services that are configured and deployed by the infrastructure operations manager 108, and specifically processed by the computing resources module 206.

The networking module 208 may provide guidance to the service owner 102 and may configure and/or provide networking infrastructure to provide adequate connectivity, bandwidth, and other networking features to support the computing service 104. In some embodiments, the networking module 208 may configure virtual internet protocols (VIPs) for use by the computing service 104, such as when the computing service is supported by a cloud computing platform. The networking module 208 may assist the service owner in setting up a round-robin, least-congested, spill-over, queuing, connections/box, or other network configurations typically deployed for computing services.

The security module 210 may provide guidance to the service owner 102 to select, configure, and/or implement security for the resources 106 and/or the computing service 104. The security may include providing encryption, establishing firewalls, generating credentials, providing identity verification, or performing other security operations. The security module 210 may guide the service owner 102 through various selections to obtain resources to implement appropriate security based on the needs and/or specifications provided by the service owner 102.

The alarm module 212 may provide guidance to the service owner 102 to create, configure, and/or implement a set of monitors and alarms for the computing service 104. The alarms may help the service owner 102 monitor operations and performance of the computing service 104 once the computing service is deployed and in production (e.g., executing on the resources 106, etc.). The monitors may be used to monitor processor activity, file systems, swap memory, generic errors, fatal errors, dirty memory, latency, and/or other performance metrics. When threshold values are reached or exceeded (either above or below a watermark), then an alarm may be used to provide notification to the service owner 102, another system or service, another human, etc. In some embodiments, the alarm module 212 may initiate a standard operating procedure (SOP) that involves communications to humans (e.g., a call center, a response team, etc.) to respond to some of the alarms and thus provide intervention. The alarm module 212 may also deploy automated procedures to respond to some of the alarms, such as by allocating additional resources in a cloud computing platform, and so forth.

The deployment module 214 may provide guidance to the service owner 102 to deploy the service. For example, the deployment module 214 may assist the user in providing back-up services, loading executable code for live users, or otherwise making the computing service 104 available and "live" for execution by the resources 106. In some embodiments, the deployment module 214 may deploy the computing service in stages. The deployment module 214 may also provide resources for version controls and updating the computing service during a subsequent roll-out.

The scaling module 216 may provide guidance to the service owner 102 to scale or otherwise maintain execution of the computing service 104 using the resources. For example, the scaling module 216 may provide guidance to assist the user to expand availability, reduce response time, deploy mirrored content, or otherwise maintain or scale software or hardware based on forecasts, input from the service owner 102, trending data, or other inputs. In some embodiments, the scaling module 216 may monitor traffic or otherwise monitor operation of the computing service. The scaling module 216 may then create forecasts or otherwise determine when and how the computing service 104 can be scaled based at least in part on the monitored data and/or forecasts. For example, the scaling module 216 may provide a notification to the service owner 102 that the computing service 104 is forecasted to have a metric exceed a threshold on or around a particular date/time, and thus recommend action (e.g., an authorization, etc.) by the service owner to prevent adverse effects or otherwise mitigate any negative outcomes if the forecast proves to be accurate. In some instances, the scaling module 216 may recommend ordering additional computing resources via the computing resources module 206 and/or performing other configurations via one or more of the other various modules included in the infrastructure operations manager 108.

In accordance with one or more embodiments, the infrastructure operations manager 108 may be an extensible program that enables addition and/or expansion of additional infrastructure operations to be selected, implemented, and/or deployed with or for the computing service 104. For example, the infrastructure operations manager 108 may be a platform that enables system architects to interact with, utilize, and/or create APIs to provide computing resources for disposal by the infrastructure operations manager 108 and for use with the computing service 104. The system architects may, for example, provide a new type of computing resource, such as a communications platform, which may be made accessible and configurable via the infrastructure operations manager 108 as discussed herein.

Illustrative Operation

Figure 3A:
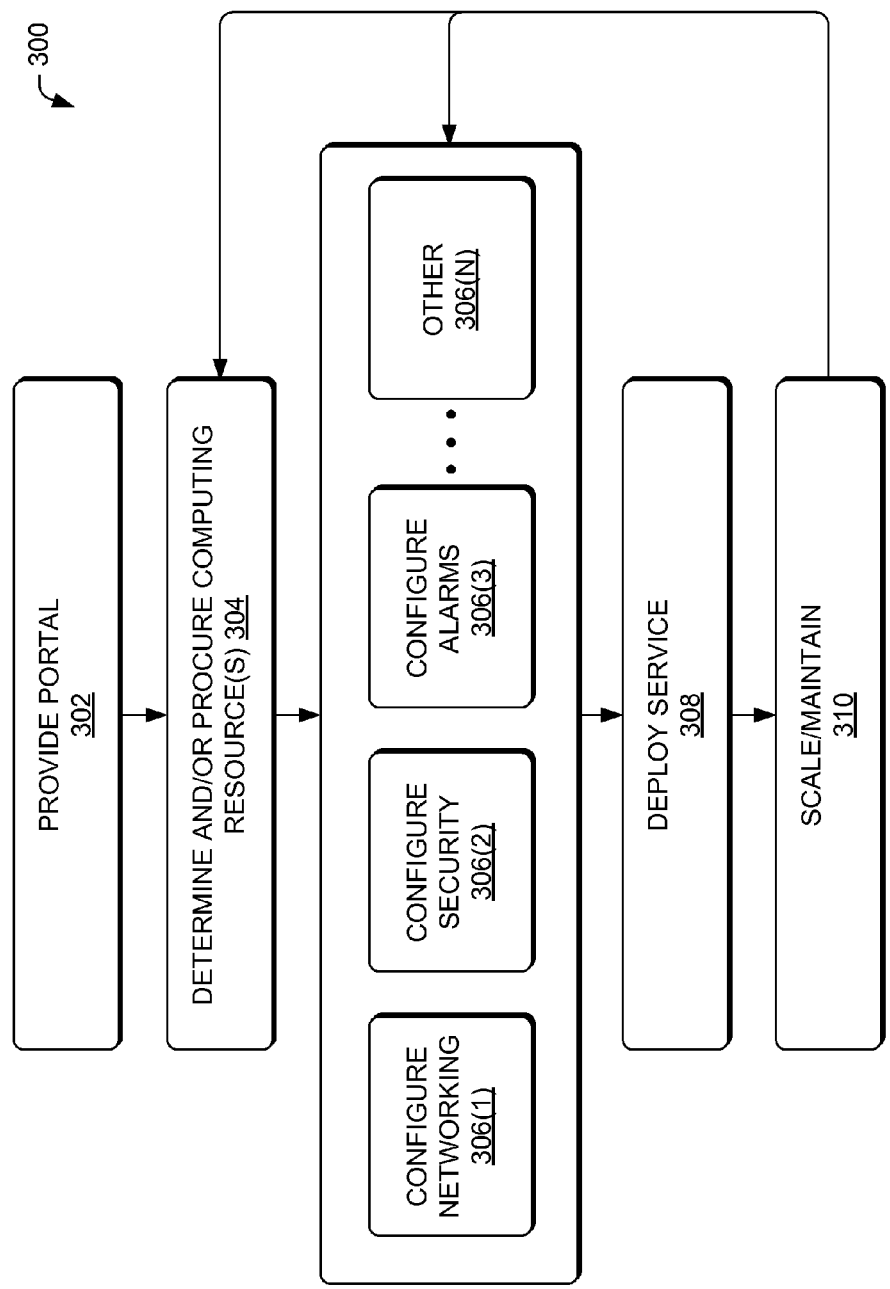
FIGS. 3A and 3B are flow diagrams of illustrative processes to automate infrastructure operations to deploy and maintain a computing service.
Figure 3B:
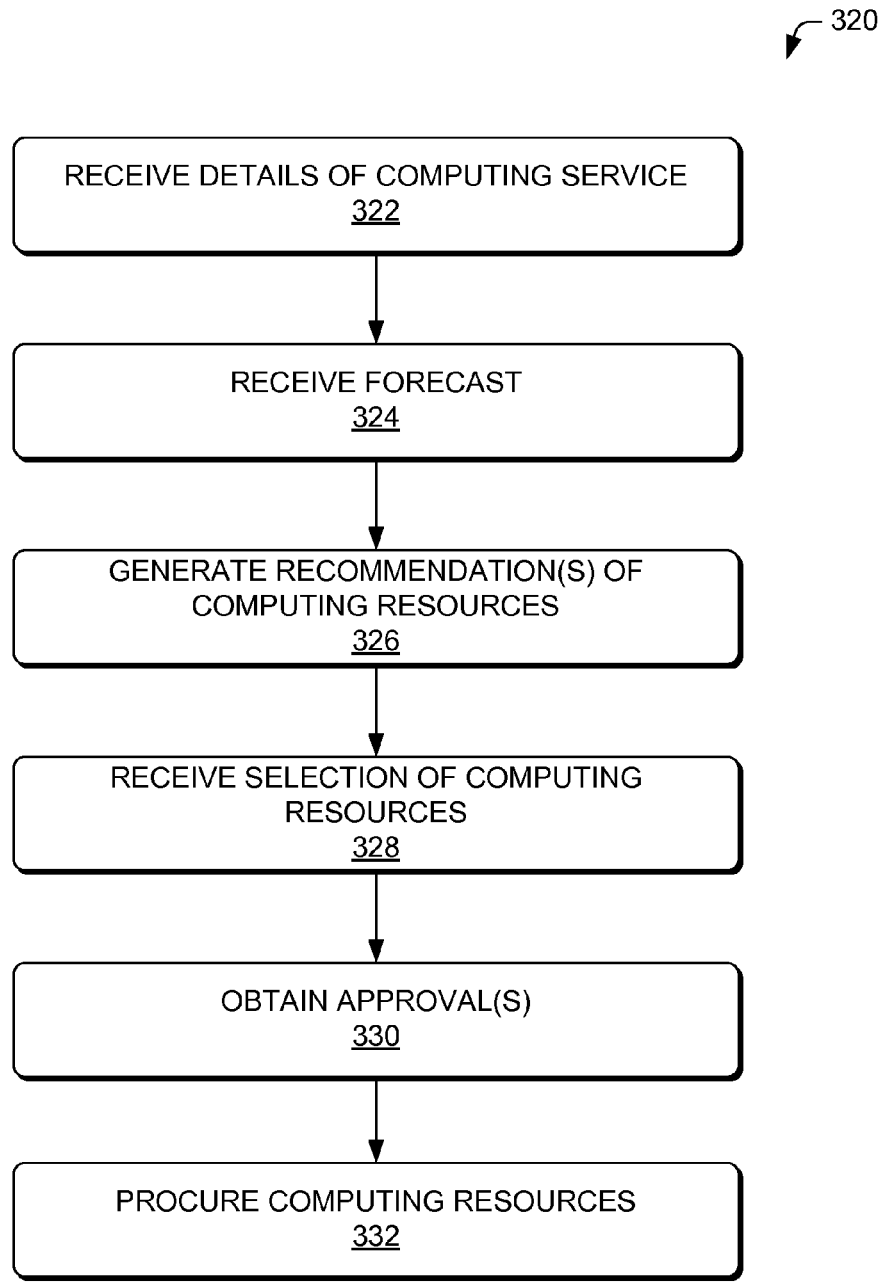

FIGS. 3A and 3B are flow diagrams of illustrative processes to automate infrastructure operations to deploy and maintain a computing service. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Other processes described throughout this disclosure shall be interpreted accordingly.

FIG. 3 shows a process 300 that is described with reference to the environment 100 and may be performed by the host servers 112 using the infrastructure operations manager 108. Of course, the process 300 (and other processes described herein) may be performed in other similar and/or different environments.

At 302, the infrastructure operations manager 108 may provide a portal to enable the service owner 102 to access the infrastructure operations manager 108 and perform automated infrastructure operations using the various modules of the infrastructure operations manager 108. The portal may be implemented as one or more user interfaces that provide access to a control system. An example user interface is shown and discussed with reference to FIG. 5. The portal may guide the service manager 102 in configuring and deploying the computing service 104 in accordance with a service level agreement (SLA) that may be provided by the service owner, a company, or another entity or service.

At 304, the computing resources module 206 may determine and/or procure computing resources (e.g., computing hardware, computing software resources, etc.) based on data received from the service owner 102. The computing resources module 206 may procure (e.g. provision, use, acquire, etc.) computing resources by acquiring, renting, leasing, accessing, and/or otherwise interacting with computing resources or an associated controller to enable execution of the computing service 104 by the computing resources. For example, the computing resources module 206 may assist the service owner 102 in accessing a cloud computing platform to host and execute the computing service 104. In accordance with one or more embodiments, the computing resources module 206 may receive inputs from the service owner 102 to determine the computing resources requirements. The inputs may include forecasts or other projections of workload, the computing service 104 (e.g., source code, etc.), and other inputs such as a roll-out date, and so forth. The computing resources may include data storage, input/output controllers, and other computing resources to execute the computing service 104 per requirements set by the service owner 102. At 304, the computing resources module 206 may also configure the computing resources to execute the computing service 104. The configuration may include applying settings in the computing resources (e.g., allocation of memory, etc.), and/or performing other software configurations associated with deployment and operation of the computing resources.

At 306, the process may perform any one of the following operations irrespective of the order of description that follows. At 306(1), a network module 208 may configure networking for the computing service 104. The networking module 208 may receive input from the service owner 102 pertaining to bandwidth requirements, anticipated request volumes, anticipated spikes in traffic, latency tolerances, and/or other parameters for network performance. The networking module 208 may then configure the computing resources based at least in part on the input from the service owner 102. In some instances, the networking module 208 may configure VIPs for user by the computing service 104, such as when the computing service is supported by a cloud computing platform. The networking module 208 may assist the service owner 102 in setting up a round-robin, least-congestion, spillover, queuing, connections/box, or other network configurations typically deployed for computing services. At 306(1), the networking module 208 may also assist the service owner 102 in obtaining networking hardware, if necessary, to perform the various networking operations.

At 306(2), the security module 210 may configure security based on data received from the service owner 102. For example, the security module 210 may implement encryption of data, create firewalls, provide protocols for verifications, and/or provide other security protocols or techniques for use with the computing service based on inputs from the service owner 102. The type of security may vary widely based on the type and operation of the computing service 104. The security module 210 may provide different "packages" of security for different types of computing services, such as computing services that include user accounts, involve payment processing, involve transmission of private information, and so forth. The security module 210 may also enable the service owner 102 to pick and choose which security items or configurations are relevant for the computing service 104.

At 306(3), the alarm module 212 may create and/or configure monitors and alarms based on data received from the service owner 102. The alarm module 212 may provide a number of selectable monitors and alarms, which may be grouped in packages for different types of computing services. Standard monitors and alarms may include monitors and alarms for tracking processor activity, file systems, swap memory, generic errors, fatal errors, dirty memory, latency, and/or other basic performance metrics. The alarm module 212 may also configure custom alarms for the computing service 104 based on user input from the service owner 102. In some instances, the custom alarms may be associated with specific code, functions, or outputs of the computing service 104. At 306(3), the alarm module 212 may also assign an SOP to be implemented in response to each alarm. The SOP may include notifying a human user of the alarm or a status of the computing service 104 and/or operation of allocated computing resources. In various embodiments, the SOP may include automated responses to at least some of the alarms. The automated response may include allocation of additional computing resources or other resources (e.g., in a cloud computing platform, etc.), adjusting configuration settings, performing load balancing, or taking other action with little or no human input.

At 306(N), the process 300 may perform other types of operations that are configured via an extensible feature of the infrastructure operations manager 108. As described above, system architects may create additional functionality that may be controlled by APIs or otherwise interacts with the infrastructure operations manager 108 to support the computing service 104 for the service owner 102.

The operations may include functional aspects and may enable services to be self-services, thus enabling a developer to plug in their own implementation to perform one of the services (e.g., configure monitors/alarms, configure networks, configure services, etc.). This may create a library of implementations which is self-service extensible (expandable), which creates self-service polymorphism of the infrastructure operations via an extensible platform.

Self-service infrastructure operations polymorphism may be achieved by late binding associations of canonical resource instances to each other. Late binding associations trigger workflows that transform a composition of service resource instances from one configuration state to another configuration state.

Thus, different APIs need not be created for each change of inputs, but instead, an API may be designed so that it is flexible and accommodates use of different inputs. The API may not need user input to make a decision or deal with the different types of input, but can do this autonomously. Polymorphism may be used to optimize settings, such as alarms and monitoring for different situations, such as a high throughput configuration, a high memory configuration, a high processor configuration, etc. Polymorphism may use geolocation to determine if there is a geographic sensitivity to where and how a service is placed in comparison with operation of the service.

An example is the transformation of a service from being hosted on a current infrastructure (e.g., a classical infrastructure, etc.) to a new infrastructure (e.g., cloud-based infrastructure, etc.). A new or legacy service may be represented with a set of canonical resource instances such as services, hosts, placements, monitors, alarms, and so forth. Inputs required to provision a service resource may initially deploy the service to a set of current hosts with the requisite monitors and alarms codified by templates for such resource instances. When the time comes to begin migrating the service to another platform (e.g., to a cloud service, etc.), the configuration inputs may change thereby triggering binding of the service to a mixed set of current and new hosts, each host instance being created with the requisite monitors and alarms codified by templates associated with needs/requirements of the current and new hosts. The service may still exist, but may have morphed based on changes to configuration inputs, those inputs triggering new/changed associations between the service and other resource instances. At this point the service has evolved to a hybrid of current and new infrastructure. As inputs change the service may ultimately be driven to an all new configuration state (e.g., all cloud services, etc.) or shift back to all-current infrastructure (e.g., all local services, etc.).

Configuration may be driven by differentiation based on the inputs provided to configure each resource instance participating in the set of resources that deliver the service. The inputs may change based on human data entry or autonomic analysis that triggers input changes. Examples of such inputs include, but are not limited to, computing host affinity with persistence resources, computing demands (processor speed), memory demands, input/output demands, failure isolation, wire transmission optimization, shared disk versus non-sharing model, geo-location criteria, and so forth. Templates for configuring resources may be selected based at least partly on these inputs, the templates being utilized by workflows to drive transformation from one service configuration state to the next. By making self-service infrastructure operations based on polymorphic canonical resources, late binding of resource instance associations can be performed, thereby avoiding operations activities becoming hardwired to any particular architectural model and enabling opportunities for autonomic operations.

At 308, the deployment module 214 may set up and implement a deployment of the computing service 104 based on data received from the service owner 102. The configuration may include loading executable code of the computing service 104, creating backup data and redundant services, and initializing the computing service 104 for access by other parties (e.g., users, etc.) and/or by other resources (e.g., by other software). In some embodiments, the deployment module 214 may deploy the computing service in stages at 308. The deployment module 214 may also provide resources for version controls and updating the computing service during a subsequent roll-out. For example, the deployment module 214 may enable the service owner 102 to perform testing of a new version of the computing service (e.g., new features, etc.) while continuing to deploy and execute a previous version of the computing service 104, which may enable the service owner 102 to mitigate risk of quickly switching to a new version.

At 310, the scaling module 216 may scale or otherwise modify configurations based on data received from the service owner 102. In some embodiments, the scaling module 216 may provide guidance to assist the user to expand availability, reduce response time, deploy mirrored content, or otherwise maintain or scale software or computing resources based on forecasts, input from the service owner 102, trending data, or other inputs.

In some embodiments, the scaling module 216 may predict when the computing service needs to be scaled based on performance of the computing service over time (e.g., using trends, forecasts, etc.). The scaling module 216 may monitor activity of the computing service 104 and/or the resources 106 and create a forecast for scaling. The scaling module 216 may provide a recommendation to the service owner 102 at various times that is based on the forecast. For example, the scaling module 216 may recommend that the service owner 102 authorize acquisition of additional computing resources to support expected increases in traffic, etc.

Following the operation 310, the process 300 may return to any one of the operations 304 or 306(1)-306(N) to perform maintenance, adjust settings and/or configurations, scale the computing service 104, and/or perform other related maintenance on the computing service 104 and/or the resources 106. The scaling may be initiated by the service owner 102, in response to one or more of the alarms, and/or based on other indicators or thresholds.

In an example use of the infrastructure operations portal, a service owner 102 may initially perform any one of the operations 304 or 306(1)-306(N) when initially interacting with the portal. For example, the service owner 102 may already have computing resources for the computing service 104, such as when the computing service 104 is part of the computing resources or the service owner 102 has previously procured the computing resources. The service owner 102 may then move directly to implementation of one or more of the operations 306(1)-306(N) without necessarily proceeding with the operation 304.

FIG. 3B shows an illustrative detailed process 320 that may be performed during execution of the operation 304. Each of the operations 306(1)-306(N) may also include additional detailed processes (e.g., workflows) that include further granularity as described in the process 320. Thus, similar processes as the process 320 may be implemented for each of the operations 306(1)-306(N).

At 322, the computing resources module 206 may receive details of the computing service 104. The details may include a designation of a type of computing service, the actual source code of the computing service, or other levels of details pertaining to the computing service 104. The details may be used to determine the computing resources necessary to support the computing service 104.

At 324, the computing resources module 206 may receive a forecast of operation of the computing service. In some instances, the forecast may be a relative forecast that references another computing service. The forecast may include projections of units calculated, units sold, or other applicable metrics.

At 326, the computing resources module 206 may generate one or more recommendations of computing resources for use by the computing service 104. The recommendations may include different types of computing resources, computing resources of different configurations, computing resources of different suppliers, and so forth. The computing resources module 206 may also include additional information with the recommendations, such as cost information, performance information, and so forth.

At 328, the computing resources module 206 may receive a selection of at least one of the computing resources. For example, the service owner 104 may select one of the computing services recommended at the operation 326.

At 330, the computing resources module 206 may seek approval for the selected computing resource from the operation 328. For example, the approval operation may be performed when the infrastructure operations manager 108 is implemented with control authorizations (checks, safeguards, etc.).

At 332, the computing resources module 206 may procure the computing resources when the approval(s) are obtained at the operation 330. As discussed above, the procuring may include provisioning the computing resources or acquiring the computing resources from other sources or entities via a least, rental, shared use, or other type of arrangement.

Illustrative Interface

Figure 4:
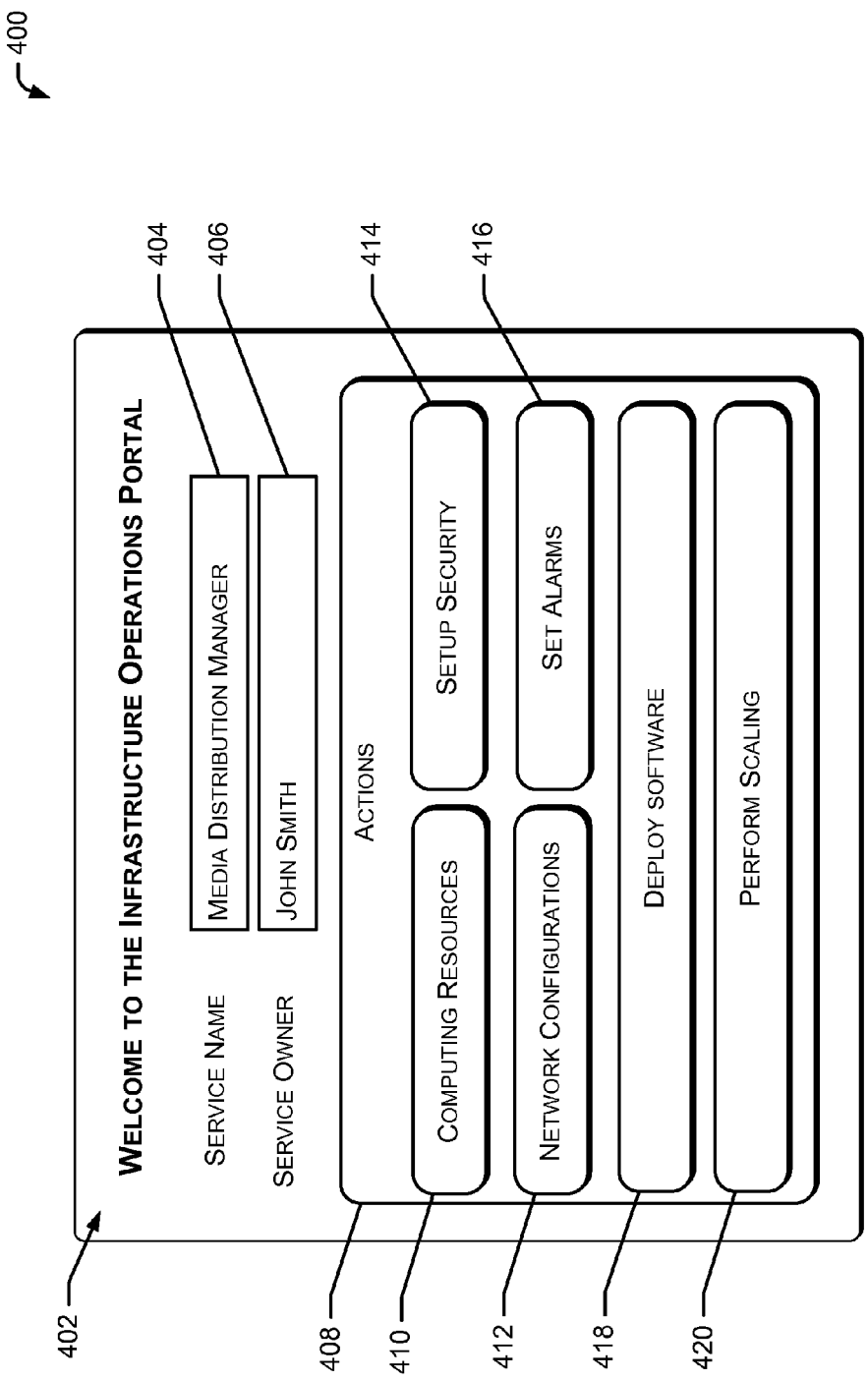
FIG. 4 is an illustrative user interface (UI) of a portal that enables a service owner to perform automated infrastructure operations.

FIG. 4 is an illustrative user interface (UI) 400 of a portal 402 (e.g., the portal 118) that enables the service owner 102 to perform or control automated infrastructure operations as discussed herein. Although the portal 402 is shown as a single UI, the portal 402 may be implemented using any number of UIs. For example, each command that is accessible on the UI 400 may open or retrieve another UI (page, tab, etc.) that includes additional information, guidance, selections, and/or data for the service owner 104 to use to implement the automated infrastructure operations. Thus, the UI 400 is a non-limiting UI that shows some of many possible commands that may be used to access the various modules discussed with reference to FIG. 2 and used to implement some or all of the processes described with reference to FIGS. 3A and 3B.

In various embodiments, the portal 402 may include a service identifier 404 and a service owner identifier 406. The portal 402 may include an actions section 408 that includes commands to access some or all of the modules described with reference to FIG. 2.

In accordance with one or more embodiments, the actions section 408 may include a computing resources command 410 to configure and perform functions associated with the computing resources module 206. A network command 412 may configure and perform functions associated with the network module 208. A security command 414 may configure and perform functions associated with the security module 210. An alarm command 416 may configure and perform functions associated with the alarm module 212. A deployment command 418 may configure and perform functions associated with the deployment module 214. A scaling command 420 may be used to modify settings and perform functionality associated with the scaling module 216.

An example interaction is described next that may follow selection of the computing resources command 410. Following the selection, the service owner 102 may be presented with another UI (e.g., page, tab, etc.) that include various inputs for use by the computing resources module 206, such as to allow the service owner 102 to interact with a template/workflow. For example the UI may provide inputs for the details used by the operation 322. The UI may also provide inputs for the forecast used by the operation 324. The UI may also include other settings, inputs, or data for manipulation by the service owner 102. The UI may enable performance of some operations, such as to generate the recommendations via the operation 326 after some of the inputs are received by the UI. The service owner 102 may then select a computing resource via the operation 328, seek approvals via the operation 330. The UI may then enable the service owner 102 to procure the computing resources to perform the operation 332.

Illustrative Implementation

FIG. 5 is a block diagram of data flows 500 between various resources to provide automated infrastructure operations. In accordance with one or more embodiments, the service owner 102 may interact with the portal 402 to control various aspects of the infrastructure operations manager 108, such as to access a configuration 502, a workflow 504, and/or a namespace management browser 506. The portal 402 may be a window into services for developers and expansion launch managers. The portal 402 may support self-service discovery, configuration and extension of services.

In accordance with various embodiments, the namespace management browser 506 may enable access to a namespace manager 508 that may be a central location for metadata regarding service configuration adapters (SCAs) and tenancy properties (and property authorities). SCA and tenancy property metadata may be readable from the namespace manager 508. A subset of SCA and tenancy property metadata may be set through the namespace manager 508. The SCA may be a stateless proxy with a consistent programming model that maps requests against interfaces to Native APIs wrapped by the SCA. An SCA may provide, via an SCA caller 510, metadata describing its consumed properties, produced properties, SCA/event dependencies, and endpoints. An SCA may be owned and deployed by the owner of the wrapped Native APIs.

In some embodiments, a workflow 512 may be a convenience function that provides a workflow service allowing application builders to define workflow definitions 514 as an inclusion set of SCAs to call. The service may dynamically build a graph based on dependencies that define the call sequence based on SCAs included in a Workflow Definition. Inspecting the graph may also enable the workflow service to generate a list of inputs that are not produced by SCAs but may be required as human inputs when the workflow executes.

The portal 402 may include datastores 516 for storing various data, templates, workflows, or other data for use to implement the infrastructure operations as discussed herein. The datastores 516 may include a portal store 518, a namespace management store 520, and/or a workflow store 522.

Ultimately, the portal 402, via the namespace manager 508 and/or the workflow 512, may interact with the various services 524 of the infrastructure operations manager 108, which may each include local configuration stores 526 to store associated data for the module.

As shown in FIG. 5, the infrastructure operations manager 108 may be implemented with framework elements that have a canonical API set, such as the different APIs associated with the infrastructure operations manager 108 and the associated implementations against the APIs, which may be implemented as external tools via the service 524. In some embodiments, one of the services may interact with an interface API in communication with an alarm module, a diagnostic module, and so forth.

Example Canonical Infrastructure Automation API Set

A canonical set of APIs may be used to create and implement an Infrastructure Operations Automation API. Example APIs are listed below.

A Capacity Analysis API may measure, predict and otherwise determine capacity of computing resources used to implement the computing service.

An Auto Scaling API may scale the computing resources to facilitate changes in demand, performance, or other metrics associated with performance of the computing service.

A Build API may perform build operations to implement the computing service for deployment by the computing resources.

A Deploy API may perform operations to deploy the computing service for execution by the computing resources.

A Permissions API may manage permissions of the computing service and/or the computing resources.

A Security API may perform security operations for the computing service.

A Monitoring and Alarms API may determine, configure, and implement monitoring and alarms for the computing service.

An Infrastructure Operations API may manage operation of APIs discussed herein.

A Logging API may log data and perform other monitoring operations for the computing service and/or the computing resources.

A Load Balancing API may perform load balancing operations for the computing resources.

A diagnostics API may perform diagnostics for various elements of the computing service and infrastructure operations, including monitoring, capacity analysis, and other relevant functions.

An Operations Dashboard or Portal may provide access to commands and controls that may initiate use of the various APIs discussed here.

Example Service Owner Experience

The following example provides a sample use-case of a service owner named "Jim" that desires to implement a computing service using the automated infrastructure operations performed by the infrastructure operations manager 108. The use of the infrastructure operations manager 108 is in no way limited by this example.

Initially, Jim may log into a portal (e.g., the portal 402, etc.) using his credentials. Post login, Jim is presented with a layout of options in the portal. Jim selects an 'Operations' command, and selects a 'Create new Service' option from a quick launch navigation bar in the portal.

Jim is presented with a wizard that will guide Jim through the launching a new computing service. The wizard will walk him through the creation of build packages, build environments, computing resources provisioning, monitoring setup, alarm aggregation, network configurations, and other infrastructure operations as discussed in the process 300 and shown in FIG. 3A. Some of the steps of the wizard have defaults settings based on company best practices for Jim's company. Once Jim is done, Jim selects the 'Validate' command in the UI to syntactically validate the changes. Once satisfied, Jim then selects a 'create' command to create a configuration to bootstrap the new computing service. Within a time-bound service level agreement (SLA), the service is entered into production.

If or when Jim needs to adjust any of the previously created values then he can do so by selecting a resources command in the portal. Jim is able to see the various operations resources that can be configured. For example, by selecting a 'Load Balancer' in the portal, Jim is able to configure a load balancer configuration for his service, on the 'logging' section, Jim is able to configure his log rotation, and retention policy, etc. Once Jim is done setting up the Operations configuration for his service, Jim may select a 'Validate' button to syntactically validate the changes and 'Submit' command to create or update the configuration. At this point, Jim may have completed operations to support his service.

The portal may make it easy for Jim to create his own workflow. Jim may select a 'workflow' command, provide a name for the workflow, and select the services that he wants to include in his workflow. The infrastructure operations manager 108 may automatically determine a nominal sequence in which to execute the workflow, as well as auto-generate UIs to capture user input. After Jim has test-driven his workflow, and is happy with the results, he can save it and share it with his team.

The example portal may also include a 'Help' command that may contain additional developer documentation, tutorials, case studies, reference apps, sample code and forum support for service owners like Jim who want to configure operations for their services.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
receiving, by one or more computing devices, from a service owner, a request to provide infrastructure operations for a computing service;
determining, by at least one of the one or more computing devices, computing resources to support the computing service based at least in part on the request from the service owner and a forecast provided by the service owner that forecasts operation of the computing service;
procuring, by at least one of the one or more computing devices, the computing resources on behalf of the service owner to execute the computing service;
receiving, by at least one of the one or more computing devices, an input from the service owner to specify implementation of one or more custom alarms that, when implemented, monitor execution of the computing service by the computing resources, wherein individual ones of the one or more custom alarms are associated with at least one of a function, an input, or an output of the computing service;
automatically configuring, by at least one of the one or more computing devices, the one or more custom alarms, wherein the configuring is based at least in part on the input received from the service owner; and
deploying the computing service on the computing resources, the deploying including activating the one or more custom alarms that provide notifications based at least partly on the monitoring of the execution of the computing service by the computing resources.

2. The method as recited in claim 1, wherein the request is received using a portal that provides pre-configured templates to guides the service owner through selections to implement the infrastructure operations and deploy the computing service on the computing resources.

3. The method as recited in claim 1, further comprising:
analyzing a performance of the computing service on the computing resources; and
scaling the computing resources based at least in part on the analyzed performance.

4. A method comprising:
receiving, from a service owner, a request at a computing device to provide infrastructure operations for a computing service;
procuring, on behalf of the service owner, computing resources based at least in part on the request, the computing resources to execute the computing service;
configuring, by the computing device, one or more custom alarms associated with monitors that, when implemented, monitor execution of the computing service by the computing resources, wherein individual ones of the one or more custom alarms are associated with at least one of a function, an input or an output of the computing service; and
deploying the computing service on the computing resources, the deploying including activating the one or more custom alarms to provide notifications based at least partly on monitoring of the execution of the computing service by the computing resources.

5. The method as recited in claim 4, wherein the receiving the request is performed by the computing device through a portal that provides preconfigured templates to the service owner for directed selection of the computing resources.

6. The method as recited in claim 5, wherein the portal provides the preconfigured templates for the directed selection and implementation by the service owner to configure the one or more custom alarms and the monitors.

7. The method as recited in claim 4, wherein the procuring the computing resources includes determining the computing resources based at least in part on a service level agreement provided by the service owner.

8. The method as recited in claim 4, further comprising configuring network settings for the computing resources to implement a virtual internet protocol to access the computing service after deployment on the computing resources.

9. The method as recited in claim 4, further comprising configuring security for the computing service by implementing a type of encryption used by the computing service or implementing management of credentials used to access the computing service.

10. The method as recited in claim 4, wherein the procuring the computing resources includes procuring computing resources from a cloud computing platform.

11. The method as recited in claim 4, wherein the procuring the computing resources and the configuring the one or more custom alarms and the monitors is performed by a canonical set of application program interfaces (APIs) that interface with respective tools of a computing system into which the computing service is deployed.

12. The method as recited in claim 4, wherein the procuring includes provisioning computing resources under control of a host for use by the service owner.

13. One or more non-transitory computer-readable media storing computer-executable instructions that, when executed on one or more processors, performs acts comprising:
accessing a request to implement infrastructure operations for a computing service;

procuring computing resources for the computing service based at least in part on the request and a service level agreement associated with performance of the computing service by the computing resources;

configuring one or more custom alarms that, when implemented, monitor execution of the computing service by the computing resources, wherein individual ones of the one or more custom alarms are associated with at least one of a function, an input or an output of the computing service; and deploying the computing service on the computing resources.

14. The one or more non-transitory computer-readable media as recited in claim 13, wherein the configuring is based at least in part on an input received from a service owner that specifies implementation of the one or more custom alarms.

15. The one or more non-transitory computer-readable media as recited in claim 13, wherein the receiving the request to implement infrastructure operations is performed through a portal that provides instructions to a service owner for at least selection of the computing resources.

16. The one or more non-transitory computer-readable media as recited in claim 13, wherein the procuring computing resources for the computing service is further based at least in part on a forecast of operations to be performed using the computing service.

17. A system, comprising:
one or more processors;
one or more memories storing computer executable instructions executable by the one or more processors;
a hardware module stored in the one or more memories and executable by the one or more processors to receive a request for computing resources to execute a computing service for a service owner, select the computing resources based on the request, and procure the computing resources on behalf of the service owner;
a security module stored in the one or more memories and executable by the one or more processors to receive a request for a security measure from the service owner, to configure the security measure for the computing service based at least in part on the request, and to execute the security measure on the computing resources on behalf of the service owner; and
a deployment module stored in the one or more memories and executable by the one or more processors to deploy the computing service on the computing resources.

18. The system as recited in claim 17, further comprising a scaling module stored in the one or more memories and executable by the one or more processors to monitor operation of the computing service by the computing resources and scale the computing resources based at least in part on the monitored operation.

19. The system as recited in claim 17, wherein the hardware module procures the computing resources from a cloud computing platform.

20. The system as recited in claim 17, wherein the computing resources are implemented using a canonical set of application program interfaces (APIs) that interface with respective tools of a computing system into which the computing service is deployed.

21. The system as recited in claim 20, wherein the canonical set of APIs provides polymorphism to accommodate use of different types of inputs for a same one of the APIs.

22. The system as recited in claim 17, further comprising a networking module stored in the one or more memories and executable by the one or more processors to receive a request from the service owner to configure networking performance associated with at least one of bandwidth requirements, anticipated request volumes, anticipated spikes in traffic or latency tolerances, to configure the computing resources based at least in part on the request from the service owner.

* * * * *